Sept. 29, 1959     R. A. GOEPFRICH     2,906,517
DUO SERVO CYLINDER ANCHOR BRAKE Filed Oct. 16, 1953     2 Sheets-Sheet 1

INVENTOR.
RUDOLPH A. GOEPFRICH
BY Cecil J. Arens

ATTORNEY

Sept. 29, 1959     R. A. GOEPFRICH     2,906,517

DUO SERVO CYLINDER ANCHOR BRAKE

Filed Oct. 16, 1953     2 Sheets-Sheet 2

INVENTOR.
RUDOLPH A. GOEPFRICH
BY Cecil J Arens
ATTORNEY

United States Patent Office 2,906,517
Patented Sept. 29, 1959

2,906,517
DUO SERVO CYLINDER ANCHOR BRAKE

Rudolph A. Goepfrich, South Bend, Ind., assignor to Bendix Aviation Corporation, South Bend, Ind., a corporation of Delaware Application October 16, 1953, Serial No. 386,628

2 Claims. (Cl. 188—78)

This invention relates to wheel cylinder construction and more particularly to a fluid motor actuating mechanism also serving as a torque-taking means.

An object of the invention is to reduce the tendency of the brake to cause audible clicking.

Another object of the invention is to provide improved mounting for the wheel cylinder anchor which can withstand the relatively high torque loads to be transmitted thereto and yet embody a practical design the manufacture of which is within economic limits.

A still further object of the invention is to orient anchoring and retracting spring forces in such a way that the audible effects of sudden retraction of actuated parts to an anchored position will be minimized.

A still further object of the invention is to combine the foregoing objects in a mechanically simple device having characteristically reliable performance.

The above and other objects and features of the invention will appear more fully hereinafter from a consideration of the following description, taken in connection with the accompanying drawings, wherein a plurality of embodiments of the invention are illustrated by way of example.

Figure 1:
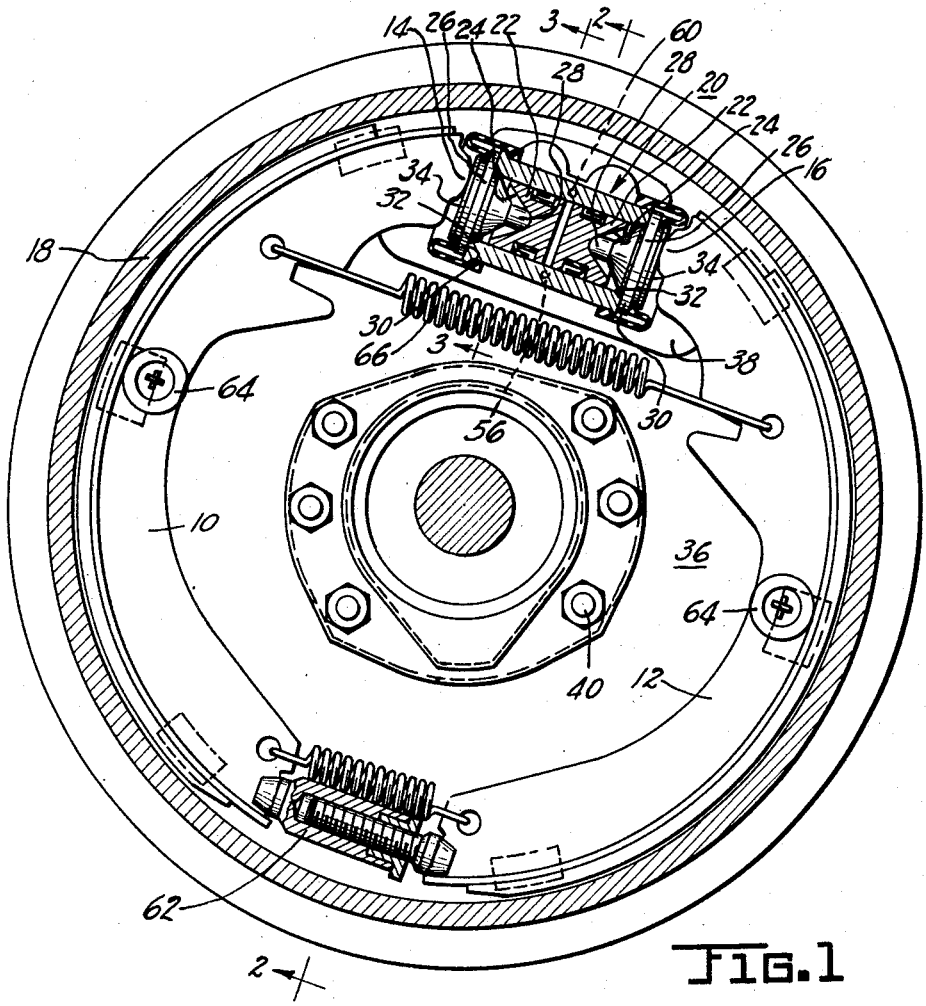
Figure 1 is a side elevation of the invention illustrating in partial section a brake assembly equipped with my novel wheel cylinder construction.
Figure 3:
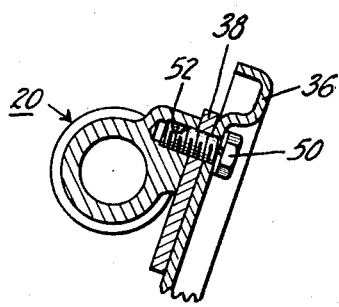
Figure 3 is a fragmental section taken on the line 3—3 of Figure 1.
Figure 2:
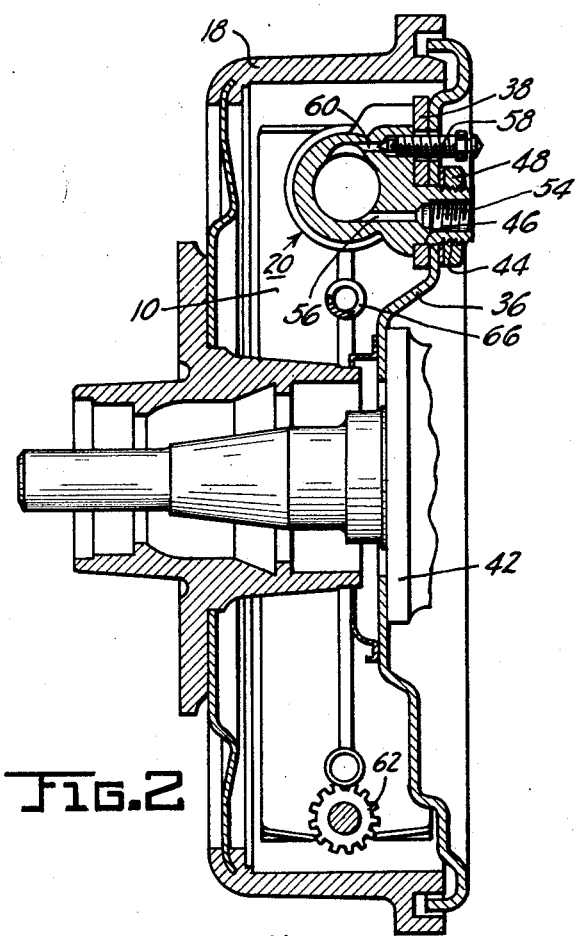
Figure 2 is a section view taken on line 2—2 of Figure 1.

Referring to the embodiment illustrated in Figures 1 to 3, a pair of articulated, T-section brake shoes 10 and 12 having adjacent expansible ends 14 and 16 are hydraulically actuated into engagement with a rotatable drum 18 by a fluid motor designated generally by reference numeral 20.

Reciprocably mounted in fluid motor 20 are a pair of oppositely acting pistons 22 having centrally located recessed portions 24 on the remote ends therof. Intermediate the pair of pistons 22 and adjacent expansible ends 14 and 16 are a pair of thrust links 26. Each of the thrust links 26 is provided with a stem 28 and an annular shoulder 30 which bear against the piston and the end of the fluid motor 20 respectively. This abutting relation of the shoulder 30 and wheel cylinder 20 determines the anchored and retracted position of the end of the brake shoe associated therewith.

Each of the thrust links 26 is chamfered at 32, and the mating edge of the wheel cylinder is also chamfered to insure proper operative position of the thrust links 28 when the brake shoes are in released position.

It will be noted from Figure 1 that the thrust links 26 are co-axial with the wheel cylinder 20, whereas the ends 14 and 16 of the shoes 10 and 12 intersect the outer faces 34 of the thrust links slightly offset from the coincident axis of the thrust links and wheel cylinder.

The present invention proposes to substantially reduce audible effect of returning links 26 to retracted position where the shoulder 30 contacts the end of the wheel cylinder, by preventing the links 26 from meeting the ends of the wheel cylinder "squarely." Instead of a "square" relative position of the link 26 and end of the wheel cylinder as they meet on the retractile stroke of piston 22, these is a slight tilting of the link 26 so that the impingement of shoulder 30 against the end of the wheel cylinder is an oblique motion causing a sliding of the link 26 to retracted position rather than a "square" slamming which produces the aforementioned objectionable clicking. Since the impingement of the link 26 is more of a sliding action the tendency of the brake to cause objectionable noise is minimized.

In addition to serving as an actuating means for applying the friction elements 10 and 12, the wheel cylinder 20 also serves as a torque taking means in which the anchoring load exerted on one or the other of the adjacent ends 14 and 16 is transmitted through the wheel cylinder 20 to a nonrotatable support member 36 provided with a reinforcing plate 38. Fastening members 40 are used to secure the support member 36 to a fixed member such as axle flange 42.

The wheel cylinder 20 has a threaded boss 44 received through congruent openings 46 in the support 36 and reinforcing plate 38. Nut 48 is then screwed on the threaded boss 44 clamping the support and reinforcing members between the base of the wheel cylinder and the head of the nut, thus securing the wheel cylinder 20 in operative position. Studs 50 are screwed into threaded openings 52 formed along one edge of the wheel cylinder thereby locating the position of the wheel cylinder 20 and preventing turning or twisting of the wheel cylinder about boss 44.

The wheel cylinder has the usual inlet port 54, and passage 56, bleed valve 58 and bleed passage 60, the latter being situated at a sufficiently elevated level to permit efficient purging of air from the system.

The brake shoes 10 and 12 may be provided with an adjustor 62 to compensate for wear of the lining on the brake shoes; conventional hold down devices 64 and return spring 66 are included.

Figure 5:
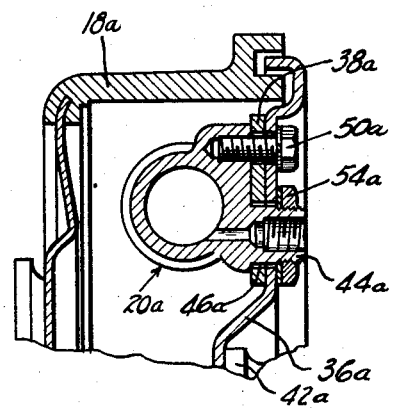
Figure 5 is a section view taken through the wheel cylinder construction on the line 5—5 of Figure 4.
Figure 4:
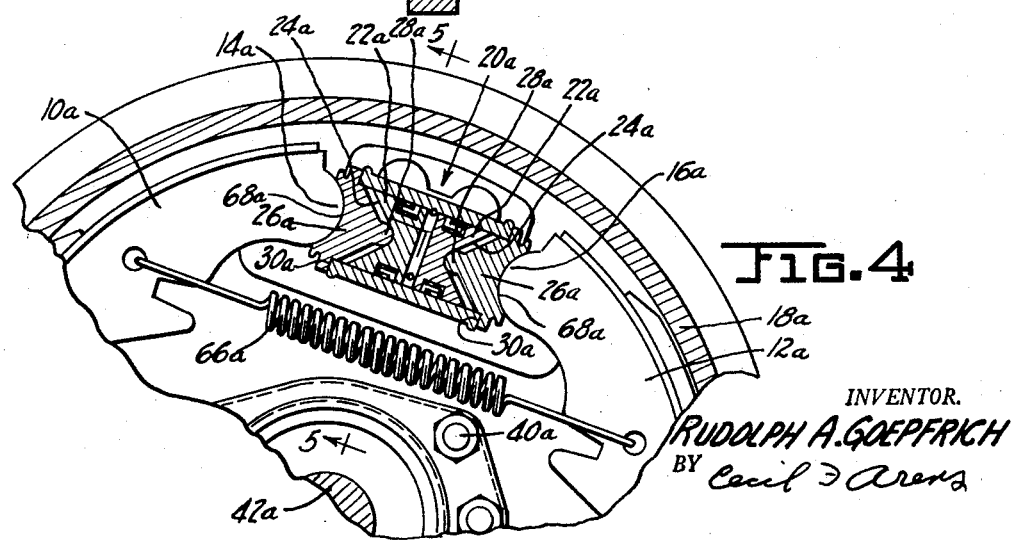
Figure 4 illustrates in elevation a fragmentary view of a second embodiment of the invention showing in a section a somewhat modified wheel cylinder construction in combination with a pair of brake shoes.

Referring now to the embodiment illustrated in Figures 4 and 5 parts corresponding to those already identified in the embodiment of Figure 1 will be designated by the same reference numeral together with the subscript a.

A pair of articulated brake shoes 10a and 12a having adjacent expansible ends 14a and 16a are adapted for actuation into engagement with a rotatable drum 18a by a fluid motor designated generally by reference numeral 20a.

The fluid motor 20a is provided with a pair of oppositely acting pistons 22a having centrally located recesses 24a on the remote ends thereof.

A pair of thrust links 26a are located intermediate the pair of pistons 22a and adjacent expansible ends 14a and 16a of the articulated shoes 10a and 12a. Each of the thrust links 26a has a stem 28a and an annular shoulder 30a adapted to engage an end of the wheel cylinder 20a for determining the retracted and anchoring position of the end of the shoe associated therewith.

The semi-circular ends 14a and 16a of the shoes are received in mating slots 68a to prevent sliding or shifting of the shoes along the central axis of the brake.

The wheel cylinder 20a, as in the previous embodiment, is a torque transmitting means as well as actuating mechanism for the adjacent ends of the shoes. The wheel cylinder 20a is provided with a threaded boss 44a received through congruent oblong openings 46a in the support member 36a and reinforcing plate 38a, the support member 36a being in turn fastened by a plurality of fastening members 40a to a fixed member such as axle flange 42a. Nut 54a is then screwed onto the threaded boss 44a thus clamping the reinforcing plate 38a and support member 36a between the nut and the base of the wheel cylinder and securing the wheel cylinder 20a in operative position. Studs 50a are then screwed into threaded openings formed along the upper edge of the wheel cylinder to prevent turning of the wheel cylinder 20a about boss 44a. Brake shoes 10a and 12a may be provided with a suitable adjustor for maintaining proper clearance of the shoes from an applied position; conventional hold down devices (not shown) and return spring 66a may also be included as in the previous embodiment.

It will be noted from Figure 4 that in this embodiment the shoes are not free-floating, that is, they are not capable of sliding movement on the ends thereof. Therefore, in order to maintain proper concentricity between the shoes and the drum when an adjustment is made, the wheel cylinder construction is moved radially to shift the shoes along the central axis of the brake. This shifting of the wheel cylinder is accomplished because the openings 46a are oblong and when the nut 54a and studs 50a are loosened, the whole brake may be shifted upwardly or downwardly in order to establish concentricity of the shoes and drum previously mentioned.

In operation, the embodiment illustrated in Figures 1 to 3 functions as follows:

Assuming direction of rotation of the drum indicated in Figure 1, fluid pressure generated in the wheel cylinder by the operator's applying effort causes pistons 22 to be spread apart. This spreading action of the pistons 22 actuates the shoes 10 and 12 into contact with the rotatable drum 18. The two shoes anchor as a unit at the contacting point of the end 16 of shoe 12 with wheel cylinder 20. The link 26 contacting shoe end 16 returned to an anchoring position after the piston associated therewith has been slightly protracted during operation of applying the brake. It is under the action of sudden return of the link to retracted or anchoring position that there is produced an audible click which results from too sudden slamming of the shoulder 30 against the end of the wheel cylinder.

As the pistons 22 are spread apart, the contact point of the end 16 of the shoe 12 bearing against face 34 of link 26 causes a slight tilting of the link 26 when it is moved away from retracted position, that is, the stem 28 bears against the innermost portion of the recess 26 of the piston 22 and since the point contact of the shoe 12 is offset from the intersection of the link 26 with the piston 22, a turning moment is produced causing a slight pivotal movement of the link 26 about its contacting point with the piston 22. As the link is returned to anchored position under the influence of the braking torque transmitted to shoe end 16, the shoulder 30 of the link contacts the end of the wheel cylinder 20 first at the uppermost portion and then in a sliding movement, the periphery of the shoulder reestablishes complete contact with the end of the wheel cylinder by oblique motion until the shoulder is square with the end of the cylinder. This glancing path of the link as it is returned to anchored position reduces the tendency of the brake to click.

When an adjustment is made of the shoes to compensate for lining wear, the ends 14 and 16 of the shoes 10 and 12 contact links 26 at a point farther removed from the axis of the coaxially located links 26 and wheel cylinder 20. This condition results because the shoes are free-floating, and in order to maintain concentricity with the drum as the lower ends of the shoes are spread radially outward toward the drum, the two shoes shift upwardly establishing a new point of contact between the ends 14 and 16 of shoes 10 and 12 and thrust links 26 associated therewith. This change in point of contact of the ends of the shoes with links 26 results in even more efficient operation of the combination of link 26, wheel cylinder 20 and shoe end toward preventing audible click.

The braking torque transmitted to the wheel cylinder 20 by the end of the shoe bearing against the link 26 associated therewith is transferred to the nonrotatable support member 36 and reinforcing plate 38 by means of the boss 44 and studs 50.

Upon release of the applying effort of the operator, the end of the shoe which is actuated is returned by spring 66 and upon retractile movement of the piston, the link re-contacts the end of the wheel cylinder in substantially the same manner as that previously described. Thus braking "click" is prevented as caused by return spring action as well as from anchoring of the brake shoe thereagainst.

The operation of the embodiment illustrated in Figures 4 and 5 is substantially the same as the previous embodiment. The principal difference in the two embodiments is in the manner in which concentricity of the shoes and drum is maintained after an adjustment is effected.

The coaxial relationship of thrust links 26a and wheel cylinder 20a is not affected when an adjustment is made by member 62. Concentricity of the shoes and drum in this embodiment is achieved by radially moving the entire wheel cylinder 20a (as previously described) when the articulated ends of the shoes are spread apart by adjustor 12 to compensate for lining wear. The operation of the links 26a, wheel cylinder 20a, and ends 14a and 16a of the shoes remains substantially the same throughout the wear life of the brake. The links 26a are caused to pivot slightly when the brake shoes are applied because of the slight circumferential shifting of the shoe end as the shoe is moved out into engagement with the drum. The tilting of the link prevents a "square" slamming of the link against the end of the wheel cylinder when the shoe end is returned by force of spring 66a on the anchoring load exerted by the shoes on the wheel cylinder. The condition of brake clicking is minimized to the same extent irrespective of degree of adjustment which has been made of the shoes.

Although certain particular embodiments of my invention have been described, it will be understood by those skilled in the art that the objects of the invention may be attained by use of constructions different in certain respects from those disclosed without departing from the underlying principles of the invention.

I claim:

1. For use in combination with a pair of articulated brake shoes adapted to anchor alternatively at either of their adjacent expansible ends, a wheel cylinder comprising a pair of oppositely acting pistons reciprocably mounted therein, said pistons having centrally located recessed portions in the remote ends thereof, a pair of coaxial thrust links intermediate said pair of pistons and the adjacent expansible ends of said shoes, each of said thrust links including a stem extending into the recessed portion of the piston associated therewith, each of said thrust links being adapted to engage the base of said recessed portion and to pivot thereon, an annular shoulder on one end of said link engageable with the end of said wheel cylinder to define the anchored and retracted position of one of the adjacent ends of the shoe bearing thereagainst, the adjacent expansible ends of said shoes engaging said links at points offset from the coaxially located cylinder and thrust links to produce turning of said links as the adjacent expansible ends of the shoes are spread apart, pivotal movement of said links producing sliding impingement of said links as they are returned to retracted position, and means for transmitting the torque through said wheel cylinder to a nonrotatable member, said means including a threaded boss extending through an opening in the nonrotatable member and secured thereto in a manner defining the operative position of said wheel cylinder.

2. For use in combination with a pair of brake shoes adapted to anchor alternatively at either of their adjacent expansible ends, a wheel cylinder comprising a pair of oppositely acting pistons reciprocably mounted therein, said pistons having centrally located recessed portions in the remote ends thereof, a pair of coaxial thrust links intermediate said pair of pistons and the adjacent expansible ends of said shoes, each of said thrust links including a stem extending into the recessed portion of the piston associated therewith, each of said thrust links being adapted to engage the base of said recessed portion and to pivot thereon, an annular shoulder on one end of said link engageable with the end of said wheel cylinder to define the anchored and retracted position of one of the adjacent ends of the shoe bearing thereagainst, the adjacent expansible ends of said shoes engaging said links at points offset from the coaxially located cylinder and thrust links to produce turning of said links as the adjacent expansible ends of the shoes are spread apart, pivotal movement of said links producing sliding impingement of said links as they are returned to retracted position, and means for transmitting the torque through said wheel cylinder to a nonrotatable member.

References Cited in the file of this patent

UNITED STATES PATENTS

| | | |
|---|---|---|
| 2,057,723 | La Brie | Oct. 20, 1936 |
| 2,280,134 | Thomas | Apr. 21, 1942 |
| 2,322,121 | Frank | June 15, 1943 |
| 2,325,944 | Frank | Aug. 3, 1943 |